UNITED STATES PATENT OFFICE.

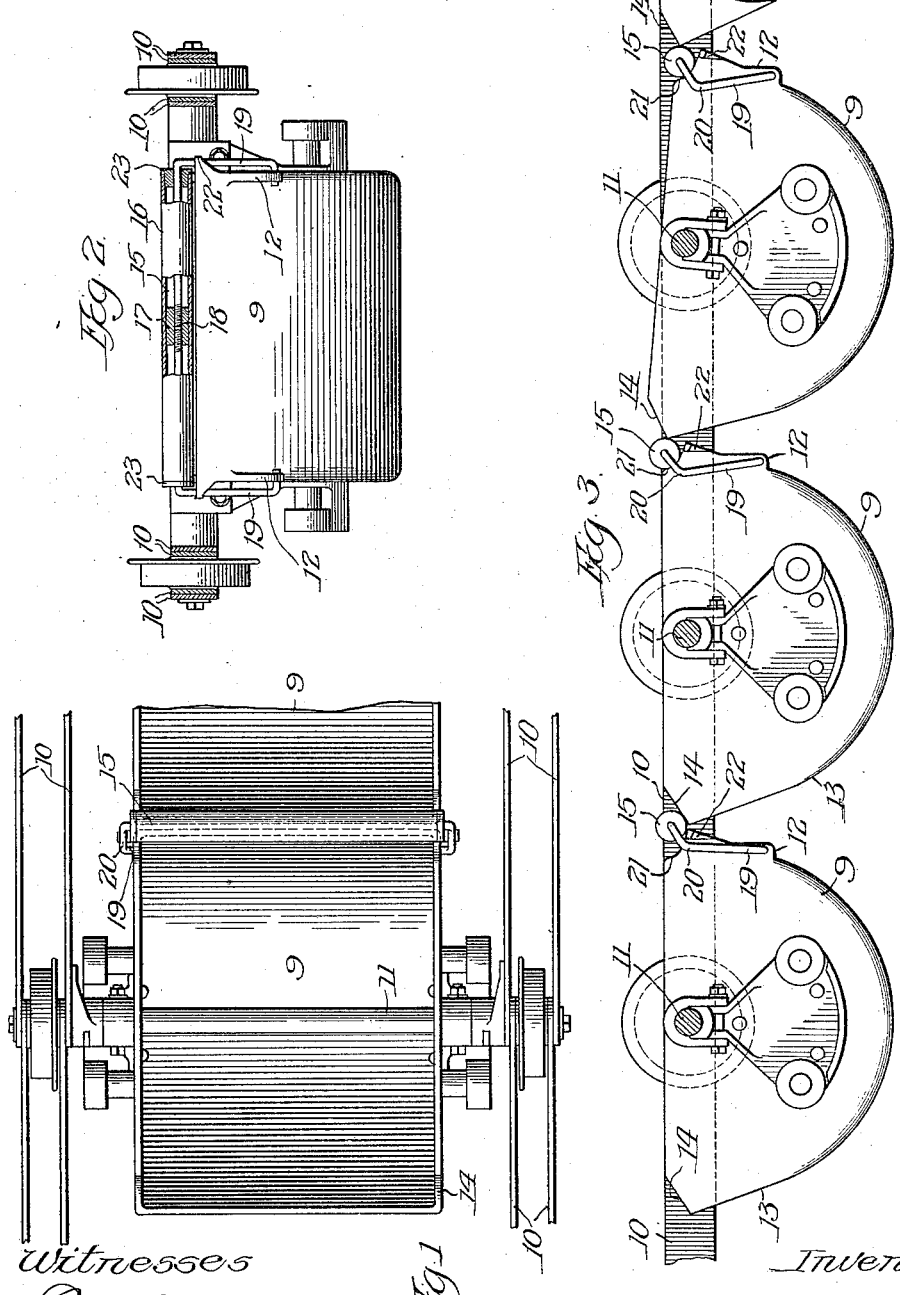

AUGUSTUS T. PERKINS, OF CHICAGO, ILLINOIS.

CONVEYER-BUCKET.

1,106,404.   Specification of Letters Patent.   Patented Aug. 11, 1914.

Application filed March 6, 1912. Serial No. 681,966.

*To all whom it may concern:*

Be it known that I, AUGUSTUS T. PERKINS, a citizen of the United States, residing at Chicago, in the county of Cook and State of Illinois, have invented certain new and useful Improvements in Conveyer-Buckets, of which the following is a specification.

My invention relates in general to conveyers, and more particularly to those devices of this class wherein a plurality of buckets carried by endless chains are used for carrying relatively heavy materials, such as coal, ashes, stone and the like, from one point to another. Where such conveyers are used it is the custom to deliver the material to the buckets from chutes while the conveyer is being continuously operated, and to this end the buckets are located as closely together as is practicable, some space however being left between them in order that they may dump freely and easily without interfering one with another.

To prevent the material from falling between the buckets as they are loaded and carried along to their dumping point, a number of forms of deflectors have been tested and employed. Such deflectors have usually been secured in some manner to the chains from which the buckets are suspended. With this type of deflector it has been found impossible to maintain a continuous engagement between the buckets and the deflectors as the chains are elevated at various points, lifting the deflectors away from the buckets, a like result being produced by any movement of the buckets themselves from normal position.

I am aware that various attempts have been made to attach the deflectors to the buckets themselves, but heretofore such devices have proven impracticable in that such deflectors have not been self-adjusting to the relative movement between the buckets as they oscillate slightly about their supporting shafts in transit or are rotated thereabout to discharge their loads.

A principal object of my present invention is to provide a deflector that will form a continuous engagement between two adjacent buckets, and which will cause the material delivered thereto by the chute to be retained in and divided between the said buckets.

A further object of my invention is to provide a self-adjusting deflector which will maintain the said continuous engagement between the buckets in spite of any movement or displacement from the normal position of the buckets as they are carried from point to point by the said chains, and which will prevent the wasting of material from a bucket when the bucket ahead is tipped out of engagement with the deflector to discharge its load into a receiving chute or dumping ground.

A still further object of my invention is to provide a deflector which will be supported by the buckets themselves, and which will operate independently of the chains from which the buckets are suspended.

An additional object of my invention is to provide an efficient deflector which will be cheap to construct and durable and efficient in operation.

Further objects and advantages of my invention will be apparent as it is better understood from the following description, which taken in connection with the accompanying drawing illustrates one preferred embodiment thereof.

On the drawing:—Figure 1 is a top plan view of a deflector made in pursuance of my invention in engagement with two adjacent buckets, Fig. 2 is an end elevation of a bucket with the deflector mounted thereon, and Fig. 3 is a side elevation of a conveyer showing a plurality of buckets and the means of mounting the said deflectors, one chain and the ends of the supporting shafts of the buckets being removed.

To illustrate my present invention I have shown a plurality of buckets 9 suspended from the conveyer chains 10 by means of the supporting shaft 11, about which the buckets may be rotated as desired. These buckets are provided adjacent and beneath one end with a pair of downwardly and outwardly disposed lugs 12 in each of which is provided an aperture. The extremity of the opposite end 13 of each bucket is cut away as at 14 in a plane inclined to the top of the bucket for engagement with a deflector 15 of the adjacent bucket. These deflectors are each preferably composed of a hollow tube 16, circular in form, within which is loosely positioned a block 17 with the apertures 18 into which are threaded the two outwardly extending supporting arms 19 having the ends 21 thereof bent downwardly and disposed within the apertured lugs 12. The arms 19 are bent intermediate the lugs 12 and the deflector as at 20 to bring the deflector 15 in contact with the cutaway portion 14 of the bucket next adjacent. To permit the deflector 15 to be rotated by the supporting arms 19 when the bucket is moved from normal position, as is shown to the left in Fig. 3, the end of each bucket and the sides adjacent the said end are cut away as at 21.

In order to retain the deflector 15 in operative relation with the end of the bucket upon which it is mounted, I have provided the outwardly disposed ears 22 extending beyond the arms 19 and adapted to limit their forward movement. In each end of the deflector 15 embracing the rods 19 I have provided an additional bearing 23, which serves also to prevent the accumulation of dirt within the deflector, insuring thereby the easy rotation of the said deflector as it is moved rearwardly or forwardly to maintain the engagement between the buckets. By bending the arms 19 as at 20 it is readily seen that the deflectors 15 will be urged toward the ears 22 by virtue of their own weight, and that when the buckets are in normal position, as is shown at the left in Fig. 3, the said deflectors will rest upon the cutaway portions of the ends of two adjacent buckets. When a bucket is tilted, as is shown to the right in Fig. 3, the deflector upon that bucket and the deflector upon the bucket next adjacent will be rolled back upon the curved cutaway portions to maintain a continuous engagement between the buckets.

It will be noted that in moving the rotatable deflectors back in the manner hereinbefore described upon the displacement of a bucket from the normal the said deflectors instead of pushing the material out of their path and permitting it to fall over the side edges of the buckets will roll over the said material, crowding it down within the bucket. It will be manifest also that deflectors made in pursuance of my invention and secured to conveyer buckets as hereinbefore disclosed will automatically adjust themselves to the movements of the buckets, maintaining a continuous engagement therewith, being unaffected by the movement of the chains carrying the said buckets, and adapting themselves to the oscillatory movement of the buckets themselves. It is readily seen, moreover, that as a bucket is moved about its supporting shaft to discharge its load, the deflector upon the bucket succeeding it will be held in place by means of the outwardly extending ears to prevent the waste of material from the said succeeding bucket until it in turn arrives at the discharging point.

It will be obvious also that various changes may be made in the minor details of construction, location and form of parts without departing from the spirit and scope of my invention or sacrificing any of its advantages, the form hereinbefore described constituting merely one preferred embodiment thereof.

I claim:—

1. The combination of a conveyer bucket, a deflector, means for supporting said deflector, mounted beneath one end of the bucket, and means comprising a pair of outwardly disposed ears formed on the bucket for limiting the movement of the said deflector.

2. The combination of a conveyer bucket, a rotatable deflector and a pair of arms having one end pivotally mounted in apertures provided in the bucket beneath one end thereof and secured at their other ends to the said deflector, said arms being bent intermediate their ends to permit the deflector to overlie the end of the bucket.

3. The combination of a conveyer bucket having a pair of apertured lugs disposed beneath and adjacent one end thereof, a rotatable cylindrical deflector, and means for supporting said deflector, comprising a pair of curved arms, each having one end pivotally mounted in one of said apertured lugs and the other end projecting into the deflector and secured therein.

4. The combination of a conveyer bucket having its upper edge cut away at one end, a pair of arms pivotally attached to said bucket beneath said cut away portion to oscillate about a fixed pivot, a cylindrical deflector rotatably carried by the upper ends of said arms, said deflector being adapted to be positioned in said cut away portion of the bucket, and means carried by the bucket adjacent said cut away portion and disposed in the path of movement of said arms to limit movement of the deflector away from said bucket.

AUGUSTUS T. PERKINS.

Witnesses:
ALEX. KISKADAM,
EUGENIE K. ADAMS.

---

Copies of this patent may be obtained for five cents each, by addressing the "Commissioner of Patents, Washington, D. C."